United States Patent [19]

Boltz

[11] Patent Number: 5,099,479
[45] Date of Patent: Mar. 24, 1992

[54] END EQUIPMENT FOR AND METHOD OF SETTING-IN COMMUNICATIONS VIA CHANNELS SELECTED IN A MULTIPLEX LINK

[75] Inventor: Bernard Boltz, Antibes, France

[73] Assignee: L'Etat Francais represente par le Ministre des Postes et Telecommunications (Centre National d'Etudes des Telecommunications), Issy-Les-Moulineaux, France

[21] Appl. No.: 495,572

[22] Filed: Mar. 19, 1990

[30] Foreign Application Priority Data

Mar. 20, 1989 [FR] France ................ 89 03611

[51] Int. Cl.$^5$ ............................................. H04J 3/06
[52] U.S. Cl. .................................. 370/105.2; 375/114
[58] Field of Search ................ 370/84, 100.1, 105, 370/105.1, 105.2, 108; 375/111, 114

[56] References Cited

U.S. PATENT DOCUMENTS

4,829,518  5/1989  Iguchi et al. ................ 370/100.1
4,979,169  12/1990  Almond et al. .............. 370/105.1

Primary Examiner—Douglas W. Olms
Assistant Examiner—Melvin Marcelo
Attorney, Agent, or Firm—Lowe, Price, LeBlanc & Becker

[57] ABSTRACT

An end equipment comprises a subscriber line interface, a communication controller, a demultiplexing circuit, a multichannel receiving circuit, a multiplexer and a network line interface. The demultiplexing circuit receives data words at a rate n.D from the subscriber line, whereby n is an integer between 1 and a maximum value N. The data words are multiplexed in n independent channels selected among N multiplexed channels in a telecommunications network link at rate N.D. Each of N channels has a basic rate D. During a setting-in and synchronizing phase of a communication, synchronization frame bits are transmitted in the n selected channels. In a multichannel receiving circuit, the synchronization bits in n reception channels of the network link are detected sequentially, and a synchronization is carried out channel by channel. When all the reception channels involved in the nD-rate communication are synchronized, transmission of the synchronization bits is stopped and is followed by a data transfer phase during which data words are transmitted at rate n.D in the link.

7 Claims, 7 Drawing Sheets

END EQUIPMENT FOR AND METHOD OF SETTING-IN COMMUNICATIONS VIA CHANNELS SELECTED IN A MULTIPLEX LINK

BACKGROUND OF THE INVENTION

1.—Field of the Invention

This invention relates to the synchronization of independent standardized channels of a telecommunications network in order to obtain a high-rate link.

2.—State of the Prior Art

In the known telecommunications networks of the synchronous time-division PCM switching type, standardized links are available in switched mode and with a basic rate, e.g. 64 kbit/s. High-rate links, e.g. with a rate of 2 Mbit/s, only available in half-permanent or permanent mode.

When a calling party needs an intermediate rate for setting-in a switched-mode communication, e.g. with a rate lying between 64 kbit/s and 2 Mbit/s, it is impossible to satisfy this request.

OBJECTS OF THE INVENTION

The main object of this invention is to provide a method for setting-in a communication through independent channels having the same basic rate and selected in a network multiplex link having a high-rate.

Another object of this invention is to synchronize reception channels selected for a communication in the link, only during a communication setting-in phase prior to a data exchange phase of the communication, thereby compensating different transit times through the network between the selected channels.

A still another object of this invention is to provide a single synchronization means common to all the channels at the reception side, thereby reducing costs of the end equipments.

SUMMARY OF THE INVENTION

Accordingly, there is provided a method for setting-in a high-rate telecommunications link between a transmission end and a reception end by association of a predetermined integer number n of independent channels in a synchronous time-division switching telecommunications network, synchronization frames being transmitted in each of the channels from the transmission end, and the frames being detected in the reception end to control the synchronization of channel receiving means and to compensate disparities in travelling times in the channels, method being characterized by in the transmission end, transmitting the synchronization frames in the channels only during a setting-in and synchronizing phase of the high-rate link prior to a data transfer phase, and in the reception end, detecting sequentially the synchronization frames, the synchronization being carried out channel by channel, and during the data transfer phase, the high-rate link having a rate equal to n.D, whereby D is a rate strictly equal to a basic rate of which each channel disposes.

The invention relates also to an end equipment receiving and transmitting digital data words at a rate n.D from and to a subscriber installation and being connected to a synchronous time-division switching network through a bidirectional time-division link at a rate N.D, where n is an integer than less the integer N, the link carrying N multilpexed channels each having a basic rate D. The equipment comprises means for transmitting data words from the subscriber installation into n transmission channels in the link, means for retransmitting data words from n reception channels of the link that correspond to n transmission channels, to the subscriber installation, and control means controlling transmitting and receiving means for setting-in a bidirectional communication through n transmission channels and n reception channels in the link, transmitting means comprising means for including synchronization bits taking place of bits in the data words to be transmitted into the transmission s channels, only during a setting-in and synchronizing phase of the communication prior to a data transfer phase of the communication, thereby forming synchronized synchronization frames respectively in n transmission channels, retransmitting means comprising N channels circuits for respectively receiving N reception channels, synchronization means activated during the setting-in and synchronizing phase and receiving sequentially the synchronization frames from n reception channels for detecting the start of the synchronization frames as a function of the synchronization bits thereby successively synchronizing the channel circuits and compensating disparities in travelling times in the reception channels, a buffer memory containing N buffer queues respectively associated with N reception channel circuits, means activated during the data transfer phase for writing the data words n associated ones of the buffer queues under the control of the synchronizing means, and means activated during the transfer phase for reading the data words in the n buffer queues thereby retransmitting multiplexed data words at rate n.D to the subscriber installation.

BRIEF DESCRIPTION OF THE DRAWINGS

Further features and advantages of the invention will be apparent from the following particular description of several preferred embodiments of this invention as illustrated in the corresponding accompanying drawings in which.

DESCRIPTION OF THE PREFERRED EMBODIMENTS

Figure 1:
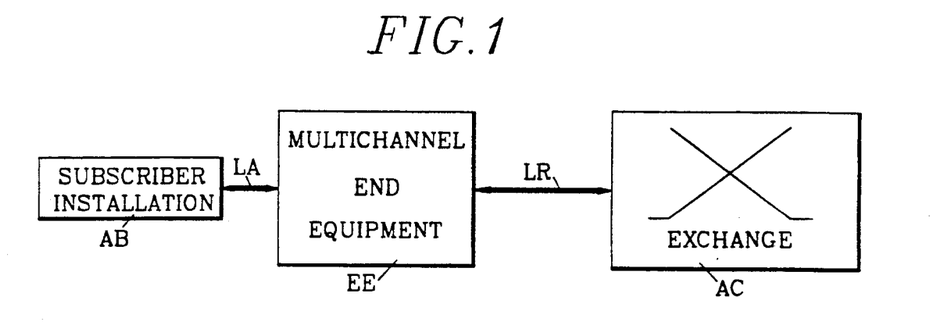
FIG. 1 is a block diagram showing an example of an interconnection between an end equipment embodying the invention associated with a subscriber installation and a local switching exchange.

In reference to FIG. 1, a multichannel end equipment EE embodying the invention is connected to a subscriber installation AB and to a local switching exchange Ac of an ISDN-type telecommunications network with synchronous time-division communication.

The subscriber installation AB is connected to the equipment EE via a bidirectional line LA. The line LA disposes of a channel of variable rate equal to n.D in both communication directions, whereby D is a basic rate e.g. equal to 64 kbit/s in the for a PCM telecommunications network a is of and n is an integer varying between 1 and a maximum number N, N lying typically between 2 and 30.

The variable rate channel is e.g. carried by PCM time-division multiplex ways at 2.048 Mbit/s. The equipment EE is connected to the switching exchange AC via a bidirectional multiplex link LR. In an outgoing communication direction, a first 2.048 Mbit/s PCM time-division multiplex way in link LR carries a maximum of N outgoing data channels $DT_1$ to $DT_N$. In an incoming communication direction a second 2.048 Mbit/s PCM time-division multiplex way in link LR carries a maximum of N incoming data channels $DR_1$ to $DR_N$.

The equipment EE can also be connected to the switching exchange AC via several bidirectional links each with e.g. a working rate equal to 144 kbit/s.

Figure 2:
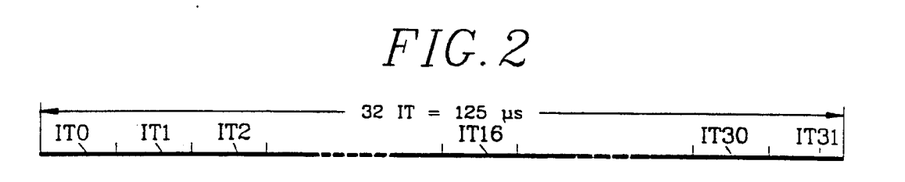
FIG. 2 is a diagram of the structure of an PCM-type frame.

As shown in FIG. 2, a 2.048 Mbit/s PCM time-division multiplex way comprises 30 data channels respectively assigned to time intervals IT1 to IT15 and IT17 to IT31, a synchronizing channel corresponding to a time interval IT0 carrying PCM frame alignment words, and a signalling channel corresponding to a time interval IT16. N data channels of a multiplex way MX are respectively attributed to the N data channels $DT_1$ to $DT_N$ or $DR_1$ to $DR_N$. The time interval IT16 carries signalling information corresponding to the N data channels.

Figure 3:
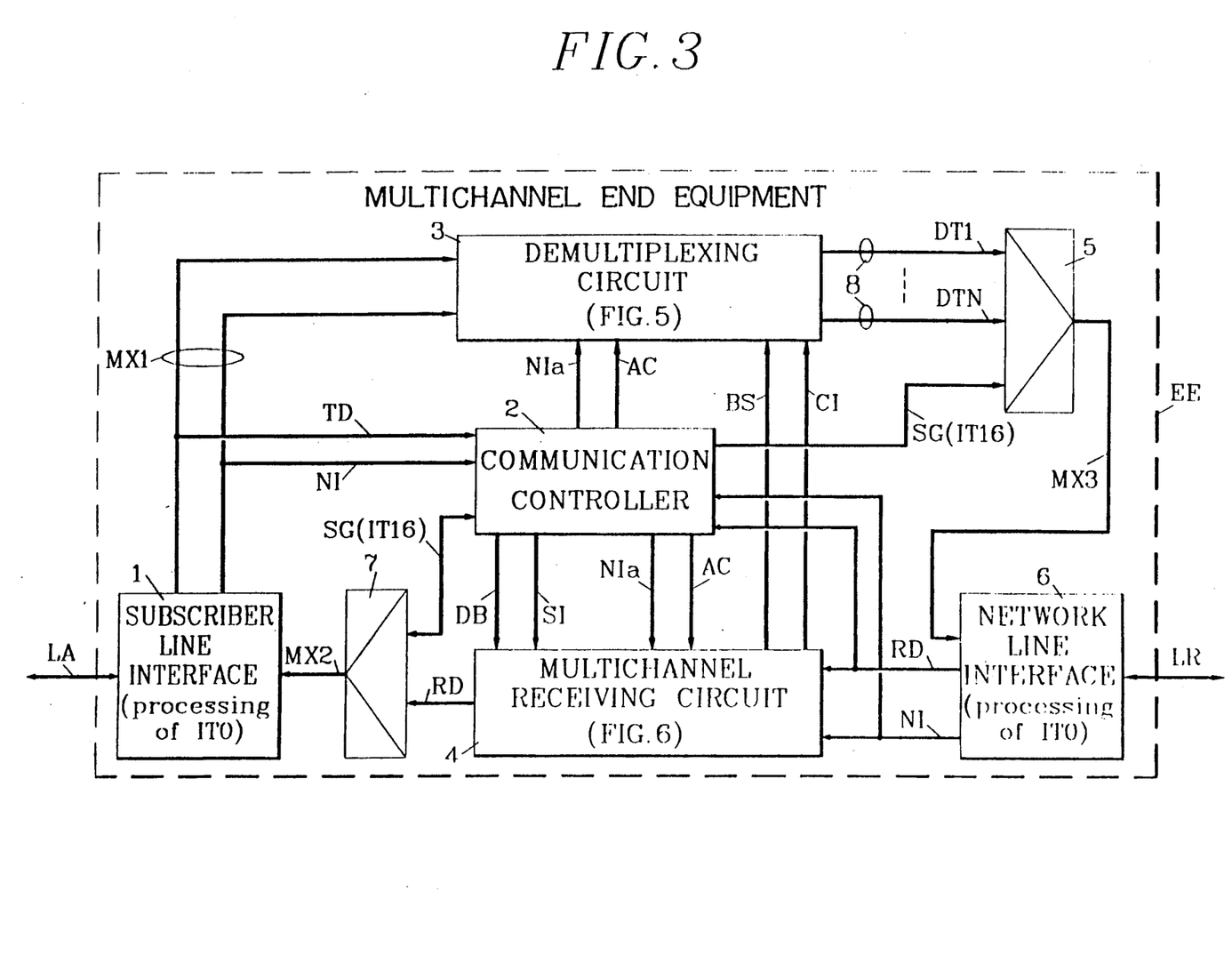
FIG. 3 is a block diagram of the end equipment.

In reference to FIG. 3, a multichannel end equipment EE embodying the invention is essentially comprised of a subscriber line interface 1, a communication controller 2, a demultiplexing circuit 3, and a multichannel receiving circuit 4, multiplexers 5 and 7 e.g. of the 2.048 Mbit/s PCM-type and a network line interface 6.

The subscriber line interface 1 is connected to the line LA.

In the outgoing communication direction, the informations transmitted by the subscriber installation AB are issued to the communication controller 2 and to the demultiplexing circuit 3 by the interface 1 in the form of data words TD multiplexed in a PCM frame, MX1. In parallel to each word transmitted, multiplexed time interval numbers NI are also supplied by the interface 1. The numbers NI vary from 0 to 31 and indicate the PCM channels of words TD transmitted by the interface 1.

In the incoming communication direction, the interface 1 receives multiplexed words in another PCM frame, MX2, supplied by the multiplexing circuit 7. Signalling informations SG(IT16) are introduced into this frame MX2 by the multiplexing circuit 7. The informations SG(IT16) are supplied by the controller 2 and are included in the time interval IT16 of the frame and are intended for the subscriber installation.

The communication controller 2 is e.g. microprocessor circuit. The controller manages the communication call control signalling and controls the operating of the end equipment EE during the different phases and subphases of communication, by producing signalling words and bits, internal control words and clock signals intended for the different circuits in the equipment EE.

The demultiplexing circuit 3 comprises a synchronization bit transmitting circuit 32 whose purpose it is to transmit the frame and multiframe synchronization bits BS to include them in the words TD in the place of the data bits, during a setting-in and synchronizing phase of the communication. A switching demultiplexer 320 is provided in the circuit 32 to transmit the synchronization bits BS in the channels $DT_1$ to $DT_N$ under the control of a signal ES that indicates in the state "1" the communication setting-in and synchronizing phase.

The communication controller 2 and the multichannel receiving circuit 4 are both connected to the network line interface 6. The interface 6 transmits to the receiving circuit 4 and to the controller 2 the multiplexed words RD of the incoming PCM frame, and multiplexed time interval numbers NI.

The communication controller 2 supplies to the receiving circuit 4 the time interval numbers NIa allocated to the different channel circuits $41_1$ to $41_N$ included in the circuit 4 according to a synchronization order allocated to the channels. The controller 2 also transmits channel selection addresses AC to the circuit 4 to address channel circuits included in the receiving circuit 4 thereby allocating the time interval numbers NIa to these circuits. Furthermore, at the end of the communication setting-in and synchronizing phase, the controller 2 transmits a rate word DB and a pulse SI to initiate a read counter included in the circuit 4. The receiving circuit 4 provides to the demultiplexing circuit 3 via a single wire, the synchronization bits BS successively corresponding to the data channels $DT_1$ to $DT_N$ as well as a switching control pulse CI to switch the synchronization to a subsequent channel circuit. This pulse CI is also supplied to the communication controller 2 which can thus follow the evolution of the channel synchronizing.

The N data channels $DT_1$ to $DT_N$ are processed in the telecommunications network as N independent standardized channels with a basic rate equal to 64 kbit/s. The N data channels $DT_1$ to $DT_N$ follow different routes in the telecommunications network and are received upon reception with variable major delays. It is therefore necessary to provide a resynchronization of the channels with one another upon reception. During the communication setting-in and synchronizing phase, the purpose of the frame and multiframe synchronization bits BS is to introduce time markings by defining synchronous frames and multiframes in the channels $DT_1$ to $DT_N$.

The framing and multiframing of the channels $DT_1$ to $DT_N$ is carried out e.g. in accordance with a recommendation from CCITT (International Telegraph and Telephone Consultative Committee) defining a digital frame and multiframe structure for multimedia services.

Figure 4:
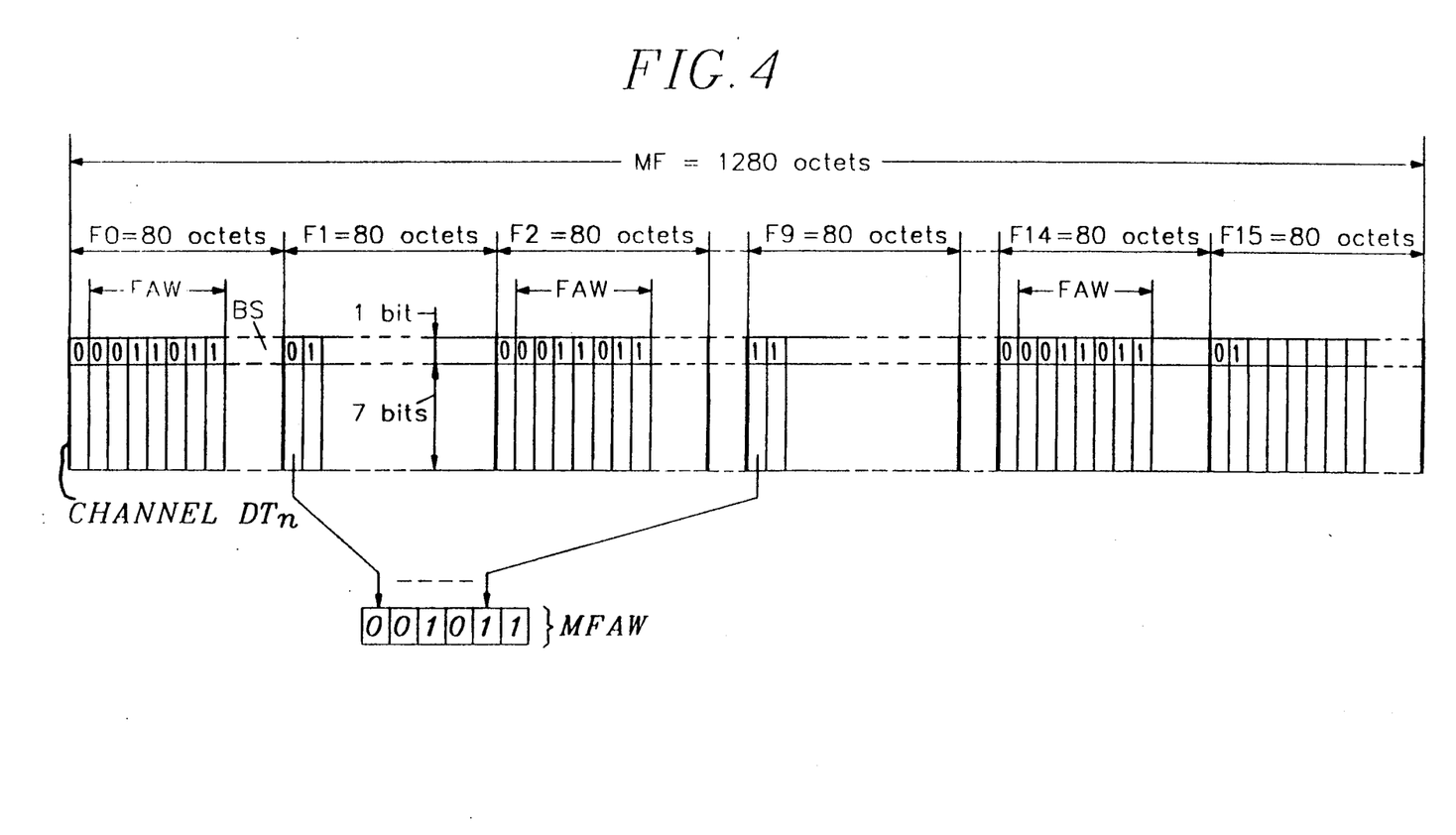
FIG. 4 is a diagram of a multiframe including synchronization frames produced by the end equipment and transmitted in channels of the telecommunications network during a setting-in and synchronizing phase of the communication.

As shown in FIG. 4 for the data channel $DT_n$, a multiframe MF is comprised of 16 successive frames F0 to F15. Each of the frames F0 to F15 is comprised of 80 successive octets of the channel $DT_n$. Each octet of the frame comprises 7 unused octets and an eighth least significant bit which constitutes a synchronization bit BS.

A multiframe alignment word FAW="0011011" is comprised in each of the even-numbered frames F0, F2, ... F14 of the multiframe MF. The frame alignment word FAW is borne by the bits BS of the second to eighth octets of the even-numbered frames F0, F2, ... F14.

A multiframe alignment word MFAW="001011" is comprised in each multiframe MF. The multiframe alignment word FAW is borne by the bits BS of the first octets of the first six odd-numbered frames F1, F3, ... F11.

Furthermore, in order to complete the time marking of the channel $DT_n$, the bit BS of the first octet of each of the even-numbered frames F0, F2, ... F14 and of the two last odd-numbered frames F13 and F15 is positioned in the state "0", and the bit BS of the second octet of each of the odd-numbered frames F1, F3, ... F15 is positioned in the state "1".

It is the multiframes MF that act as medium for the synchronization in order to enable the absorption of travelling time variations of up to 80 ms or even more if the multiframes are numbered. Furthermore, the bits BS can also carry informations of error-detector code thereby measuring the quality of service during the communication setting-in and synchronization phase.

Figure 5:
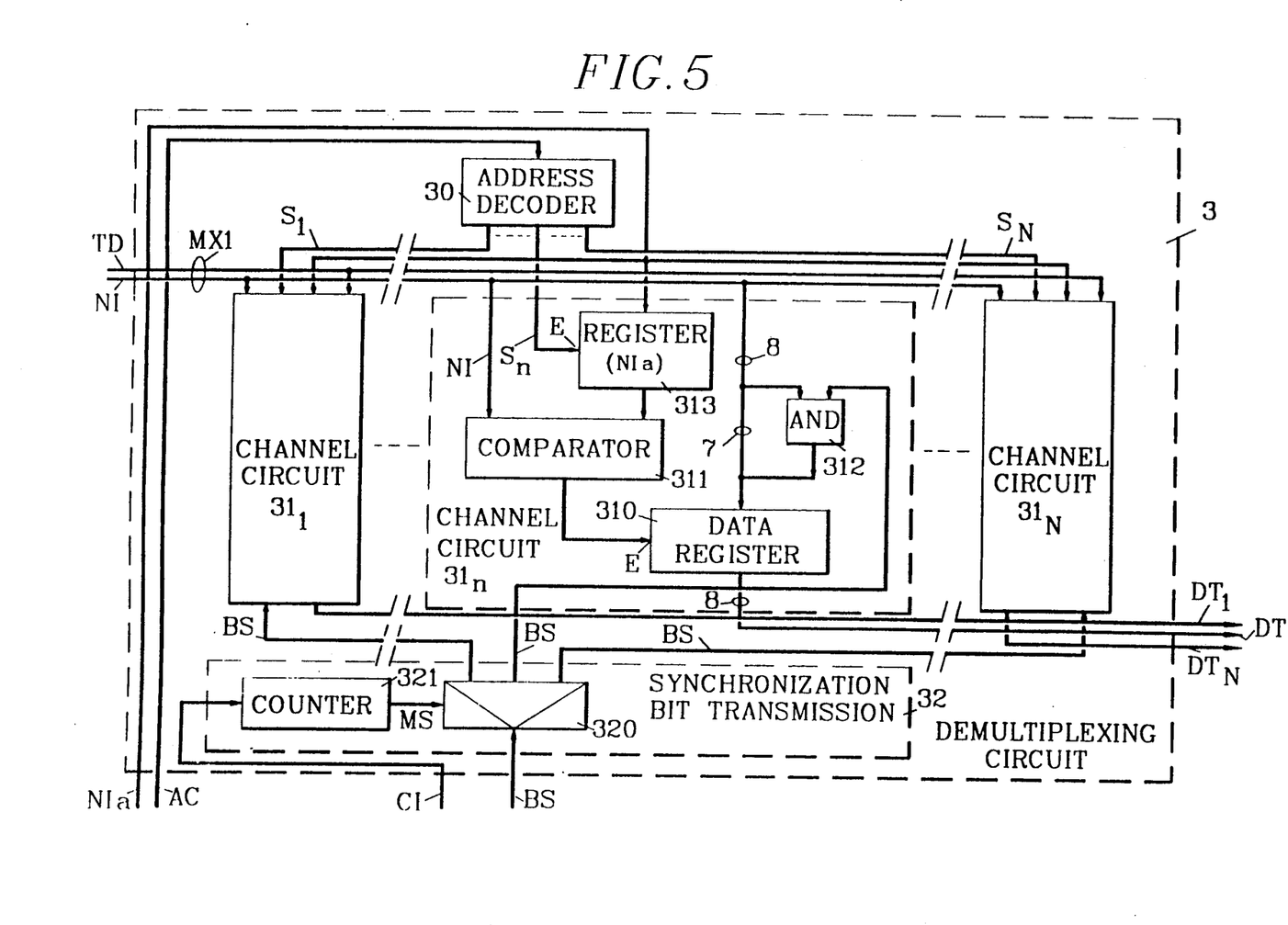
FIG. 5 is a detailed block diagram of a demultiplexing circuit included in the end equipment.

In reference to FIG. 5, the demultiplexing circuit 3 comprises an address decoder 30, N channel circuits $31_1$ to $31_N$ and a synchronization bit transmitting circuit 32.

The address decoder 30 comprises an input port receiving the channel selection addresses AC provided by the communication controller 2, and N outputs $S_1$ to $S_N$ respectively connected to the N channel circuits $31_1$ to $31_N$.

The channel circuit $31_n$ is shown in detail in FIG. 5 and comprises a time interval number register 313, a word comparator 311, a data register 310 and a logic AND gate 312. The purpose of the register 313 is to memorize the time interval number NIa from the PCM multiplex way MX1, which number is allocated to the channel circuit $31_n$ by the communication controller 2. A data input port of the register 310 is connected to an internal bus of the demultiplexing circuit 3 carrying the numbers NIa transmitted by the controller 2. A write control input E of the register 313 is connected to the output $S_n$ of the address decoder 30. When the number NIa and a corresponding address Ac=n are transmitted by the controller 2, the output $S_n$ of the decoder 30 issues a pulse in the active state "1" at the input E of the register 313 and the number NIa is then loaded in the register 313 of the channel circuit $31_n$.

The comparator 311 receives at first and second input ports respectively the time interval number NIa loaded in the register 313 and the time interval numbers NI provided by the subscriber line interface 1 and carried by an internal bus in the circuit 3. The purpose of the comparator 311 is to detect the time intervals IT of number NI=NIa in the PCM frames MX1 supplied by the interface 1 and to control in the data register 310 the loading of the words TD transmitted during the time intervals and corresponding to the data channel $DT_n$. During the setting-in and synchronizing phase, the synchronization bits BS come into the least-significant stage of the data register 310 if it is the channel of order n that is being synchronized.

The introduction of the bits BS in the place of the least-significant data bits is carried out by the gate 312. Data output ports of the register 310 of the channels $31_1$ to $31_N$ are respectively connected to N input ports of the multiplexer 5 (FIG. 3) so as to transmit the words TD in the data channels $DT_1$ to $DT_N$.

As also shown in FIG. 5, the synchronization bit transmitting circuit 32 is essentially comprised of a switching demultiplexer 320 and of a counter 321. The demultiplexer 320 receives the bits BS supplied by the multichannel receiving circuit 4 (FIG. 1). N outputs of the demultiplexer 320 are respectively connected to N channel circuits $31_1$ to $31_N$. The counter 321 receives the switching pulses CI also supplied by the multichannel receiving circuit 4. A channel selection word Ms=n is issued by the counter 321 and is applied to a control port of the demultiplexer 320. The word Ms=n selects a corresponding output of the demultiplexer 320, and the bits BS are transmitted to the channel circuit $31_n$.

The multiplexer 5 (FIG. 3) also receives corresponding signalling informations SG(IT16) supplied by the communication controller 2. The information SG(IT16) are relative to N channels $DT_1$ to $DT_N$ and are to be included in the time interval IT16 of the outgoing multiplex way of the link LR. These channels are multiplexed in multiplexer 5 octet-by-octet into a multiplex way MX3 corresponding to the outgoing multiplex way of link LR. The multiplex way MX3 is applied to an input port of the network line interface 6. The interface 6 is connected to the network via the link LR.

Figure 6:
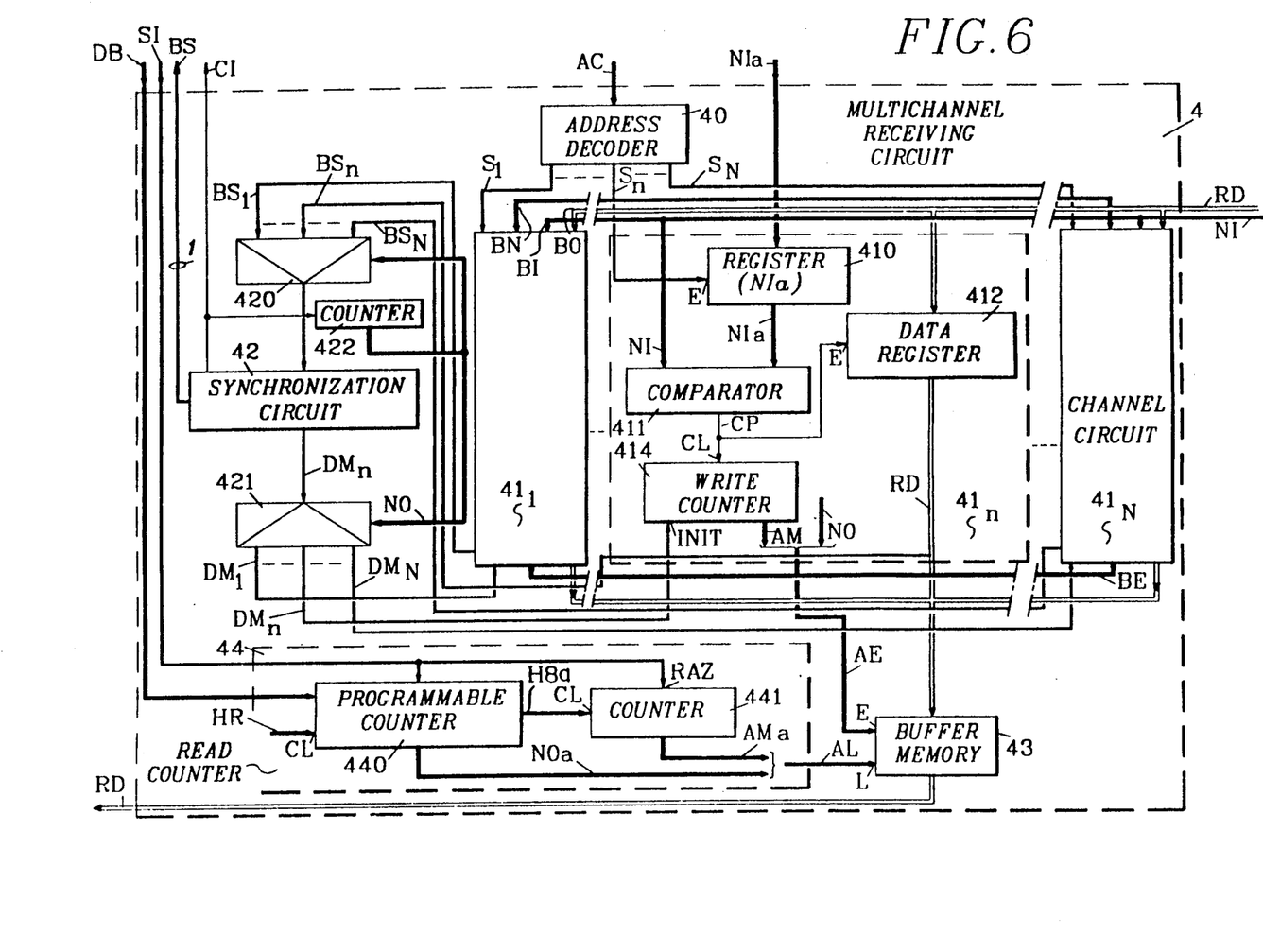
FIG. 6 is a detailed block diagram of a multichannel receiving circuit included in the end equipment.

In reference to FIG. 6, the multichannel receiving circuit 4 comprises an address decoder 40, N channel circuits $41_1$ to $41_N$, a synchronizing circuit 42, a switching multiplexer 420 and a switching demultiplexer 421 controlled by a counter 422, a buffer memory 43 and a read counter 44.

The address decoder 40 comprises an input port receiving the channel selection addresses AC provided by the communication controller 2 and N outputs $S_1$ to $S_N$ respectively connected to N channel circuits $41_1$ to $41_N$.

The channel circuit $41_n$ is shown in detail in FIG. 5 and comprises a time interval number register 410, a word comparator 411, a data register 412, and a write counter 414.

The purpose of the register 410 is to memorize the time interval number NIa from the PCM multiplex way MX1 allocated to the channel circuit $41_n$ by the communication controller 2. A data input port of the register 410 is connected to an internal bus BN of the receiving circuit 4 carrying the numbers NIa transmitted by the controller 2. A write control input E of the register 410 is connected to the output $S_n$ of the address decoder 40. When the number NIa and a corresponding address Ac=n are transmitted by the controller 2, the output $S_n$ of the decoder 40 supplies a pulse in the active state "1" to the input E of the register 410, and the number NIa is then loaded in the register 410 of the channel circuit $41_n$.

The comparator 411 receives at first and second input ports respectiveiy a time interval number NIa allocated to the circuit $41_n$ and the time interval numbers NI derived by the network line interface 6 and carried by an internal bus BI of the circuit 4. The purpose of the comparator 411 is to detect the time intervals IT of number NI=NIa in the PCM frames transmitted by the interface 6 and to control the loading in the data register 412 of the words RD transmitted during these time intervals and corresponding to the incoming data channel $DR_n$. An output of the comparator 411 derives a signal CP in the active state "1" when the equality NI=NIa is detected. The signal CP is applied to a write control input E of the data register 412 and to a clock input CL of the write counter 414.

The data register 412 comprises a data input port connected to an internal bus BO carrying the words RD. The words RD included in the time intervals whose number NI=NIa are detected by the comparator CP and loaded into the register 412 which applies them progressively to buffer memory 43 via a data output port. A least-significant output of the output port of the register 412 issues the synchronization bits $BS_n$.

The N channel circuits $41_1$ to $41_N$ respectively provide synchronization bits $BS_1$ to $BS_N$ that have been delayed differently by the transmission through the telecommunications network. The synchronization bits BS are respectively applied to N inputs of the switching multiplexer 420. An output of the multiplexer 420 is connected to an input of the synchronization circuit 42. An output of the synchronizing circuit 420 is connected to an input of the switching demultiplexer 421. The demultiplexer 421 comprises N outputs respectively connected to the N channel circuits $41_1$ to $41_N$. Order numbers NO obtained by counting from the counter 422 are applied to control inputs of the multiplexer 420 and of the demultiplexer 421. The channel circuits $41_1$ to $41_N$ are allocated in the previous data filling order and in the channel synchronization order, and their synchronization bits $BS_n$ are selected in turn. The bits $BS_n$ outgoing from the channel circuit $41_n$ are then applied to the input of the synchronization circuit 42 which in response supplies a corresponding synchronization pulse $DM_n$ indicating the start of a multiframe MF. The pulse $DM_n$ is transmitted via the demultiplexer 421 towards the channel circuit $41_n$ and is applied to a count triggering input INIT of the write counter 414. After reception of the pulse $DM_n$, the channel circuit $41_n$ is synchronized and the counter 422 is incremented so as to select the following channel circuit $41_{n+1}$ and to enable it to be synchronized. During the setting-in and synchronizing phase of a communication of rate n.D, the channel circuits $41_1$ to $41_N$ are successively selected and synchronized throughout the transmission of the bits BS in the channels $DT_1$ to $DT_N$. The synchronizing circuit 42 thus successively supplies n synchronization pulses $DM_1$ to $DM_N$ respectively for synchronizing the channel circuits $41_1$ to $41_N$. At the same time, the circuit 42 also produces the synchronization bits BS which are transmitted to the demultiplexing circuit 3. The transmission channels and the corresponding receiving channels are processed simultaneously so as to enable multiframe alignment information to be transmitted between the end equipments. The switching from one channel to the next channel is controlled by the pulse CI a time $T_0$ after reception of the multiframe synchronization information transmitted by the distant end equipment and after transmission of said information towards the distant end equipment. The relative synchronization between the different channels requires a total absence of phase drop in the transmission of the bits BS during a switching from one channel to the next.

According to the invention, the duration required for the synchronization of a channel circuit is typically in the region of 320 ms.

In the channel circuit $41_n$, the write counter 414 is a binary counter. A clock input CL of the counter 414 receives the signal CP supplied by the comparator 411. The signal CP controls the incrementation of the content of the counter 414. The counter provides a channel word address AM.

The order number No=n is set for a circuit $41_n$. The address AM and the order number NO respectively provided by the write counter 414 and e.g. by a wired memory respectively constitute a most-significant field and a least-significant field in a write address AE applied to a write address input port E of the buffer memory 43 via an internal bus BE in the receiving circuit 4.

The read counter 44 comprises a programmable counter 440 with $Log_2N$ stages and a counter 441 of capacity CM/N, whereby CM is the maximum capacity in 8-bit words of the buffer memory 43.

The main purpose of the programmable counter 440 is to cyclically produce order numbers NOa=1 to n during the data transfer phase of a communication of rate n.D. To do so, a clock signal HR e.g. of frequency equal to n.8 kHz is applied to a clock input CL of the counter 440. Prior to the data transfer in a communication of rate n.D, the counter 440 is programmed to count from 1 to n responsive to the rate word DB=n and the pulse SI supplied by the controller 2. The word DB and the pulse SI are respectively applied to a programming port and a programming control input of the counter 440.

Another purpose of the programmable counter 440 is to produce from the clock signal HR of frequency n.8 kHz a clock signal H8a of frequency equal to 8 kHz obtained by dividing the frequency of the signal HR by n. The signal H8a is applied to a clock input CL of the counter 441.

The purpose of the counter 441 is to produce a channel word address AMa incremented to the frequency 8 kHz of the clock signal H8a. The counter 441 is zero-reset by the pulse SI applied to a resetting input RAZ.

The address AMa and the order number Noa respectively constitute a most-significant field and a least-significant field of a read address AL applied to a read input port L of the buffer memory 43.

Figure 7:
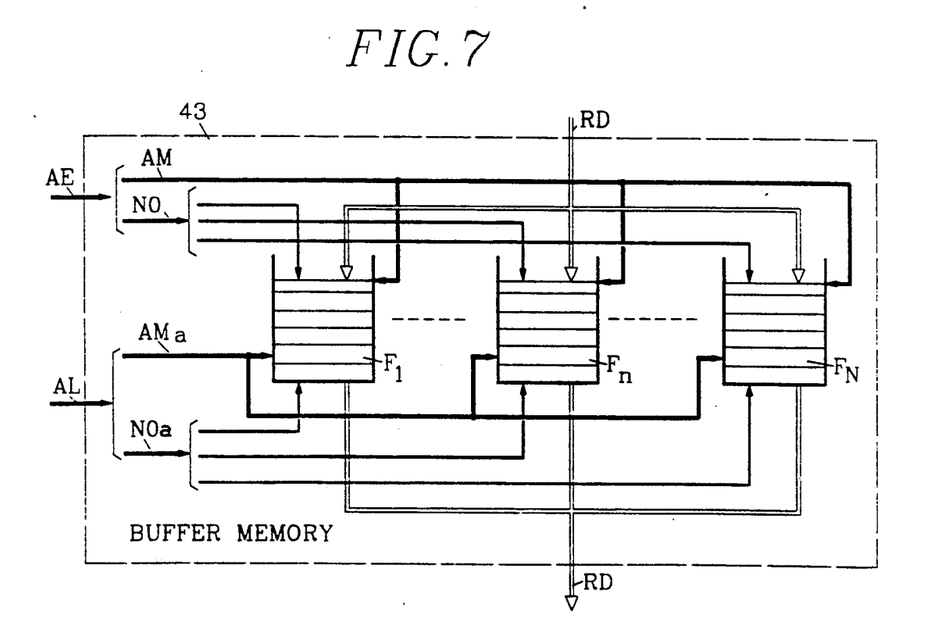
FIG. 7 is a schematic block diagram of a buffer memory included in the multichannel receiving circuit.

In reference to FIG. 7, the buffer memory 43 is equivalent to N buffer queues $F_1$ to $F_N$ respectively associated with the channel receiving circuit $41_1$ to $41_N$, and its capacity CM is in the region of 16 Koctets for N=12 and travelling time variations in the region of 80 ms.

The writing of an incoming data word RD in one of the queues $F_1$ to $F_N$ is controlled by the write address AE. The order number NO=n included in the write address AE selects for writing the queue $F_n$ corresponding to the channel $DR_n$ having transmitted the incoming data word RD. The channel word address AM addresses an empty memory cell of the queue selected $F_n$ available to load the incoming data word RD.

The reading of the outgoing data words RD in the queues $F_1$ to $F_N$ is carried out cyclically under the control of the read address AL. The reading of the data words is shifted a few words by comparison with the writing in the corresponding buffer queue to the shortest memorizing time. The order number NOa of the address AL is incremented by the rate of the signal HR and cyclically selects for reading each of the n queues $F_1$ to $F_N$ corresponding to the n reception channels $DR_1$ to $DR_N$ activated for a communication of rate D.n. The channel word address AMa addresses, in the queue selected for reading by the order number Noa, a memory cell containing a data word RD to be read. The outgoing data words RD are transmitted to the multiplexing circuit 7, then to the interface 1 after having shaped and inserted the signalling informations SG(IT16).

Figure 8:
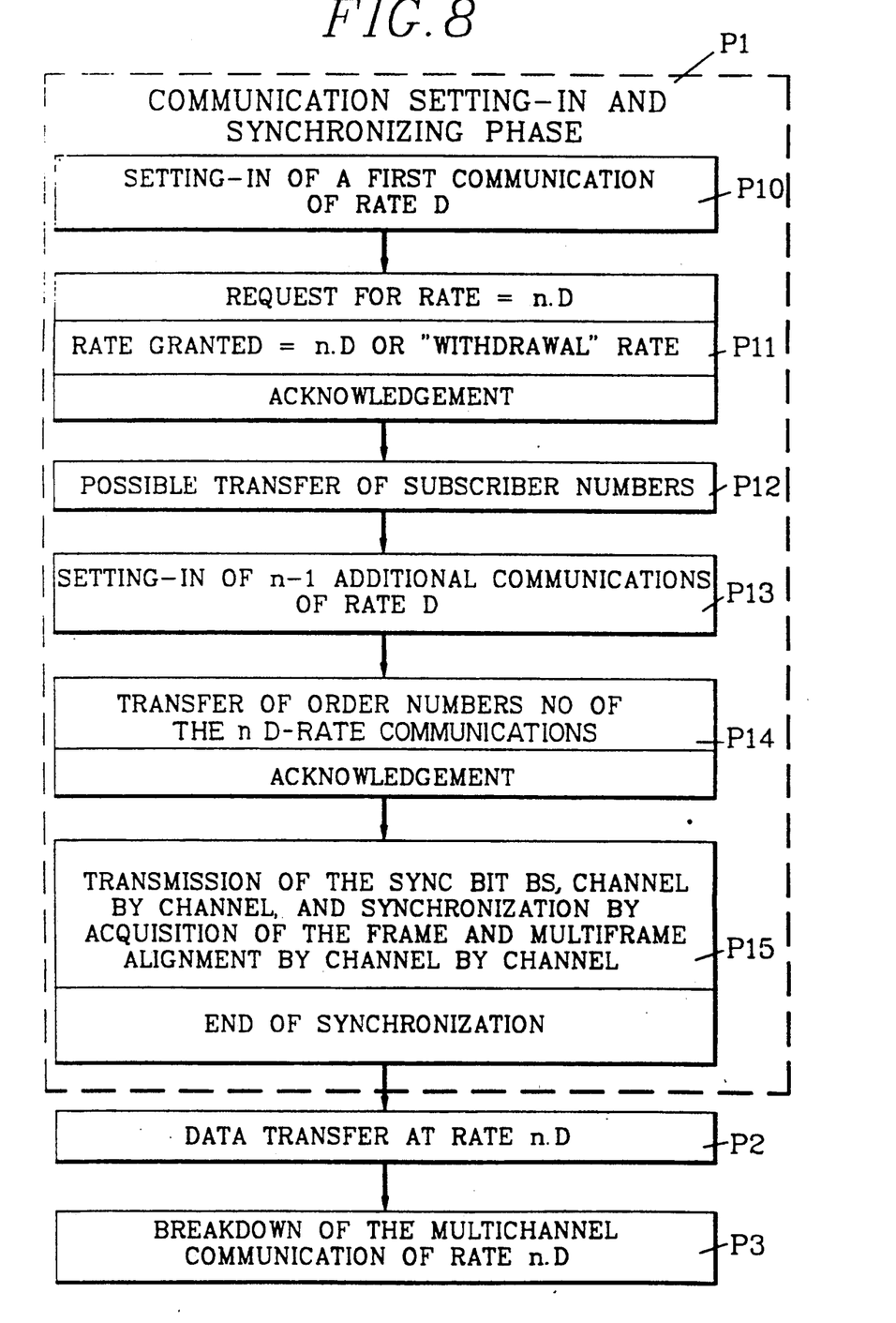
FIG. 8 is a flow diagram of different phases of a multichannel communication, particularly the setting-in and synchronizing phase of the communication.

In reference to FIG. 8, a connection between the end equipment EE embodying the invention and the telecommunications network for a communication of rate n.D is divided into three phases: a communication setting-in and synchronizing phase P1, a data transfer phase P2, and a communication breakdown phase P3.

Details of the communication setting-in and synchronizing phase P1 are given in FIG. 8; phase P1 is divided into several successive sub-phases P10 to P15.

During the first sub-phase P10, a first subscriber number is transmitted from the equipment EE e.g. via a signalling channel in order to set-in a first communication of rate D via the channels $DT_1$ and $DR_1$.

When this first communication is set-in, then takes place sub-phase P11 that is a rate negotiation phase during which the rate at which the data will be transmitted in phase P2 is agreed. A first information word for rate DB=n and an information indicating the acceptance, when this is the case, of a withdrawal rate are transmitted preferably via a user-to-user signalling channel associated with the channel $DT_1$. In the case of the number of free channels required to transmit the rate n.D being available, a second rate information word DB=n identical to the first rate information word is transmitted by return to the equipment EE. In the opposite case, the second rate information word DB indicates an available withdrawal rate. The withdrawal rate is accepted or refused by the equipment EE, and in the event of a refusal, setting-in of the multichannel communication is impossible and the equipment EE cuts off the communication. It is presumed that the rate n.D is indeed available. The equipment EE then receives a second rate information word DB=n ending sub-phase P11.

The exchange of rate information and acknowledgement words during the sub-phase P11 are monitored by the communication controller 2 of the equipment EE and the controller 2 is thus informed as to the number of rate communication numbers D it is necessary to derive.

To enable the equipment EE to set-in n−1 additional rate communications D, the network communicates, if necessary, n−1 additional subscriber numbers to the equipment EE during the sub-phase P12.

During the sub-phase P13, the controller 2 of the calling party equipment EE activates n−1 additional channels $DT_2$ to $DT_n$ carrying the n−1 additional subscriber numbers to the called party equipment so as to obtain the n−1 additional rate communications D.

During the sub-phase P14, the controller 2 of the equipment EE on the calling party transmits n order numbers NO=1 to n of the channels $DT_1$ to $DT_n$ preferably via user-to-user signalling channels. The time interval numbers are applied to the n channel circuits $41_1$ to $41_N$ of the multichannel receiving circuit 4 in the equipment EE.

The setting-in of frame and multiframe synchronization in the two communication directions and for each of the channels is carried out during the last sub-phase P15. The controller 2 of the equipment EE transmits the synchronization bits BS successively in the channels $DT_1$ to $DT_n$ and the synchronization is carried out channel by channel in the multichannel receiving circuit 4. When synchronization is achieved for all channels, the equipment EE is ready for the data transfer phase P2.

Figure 9:
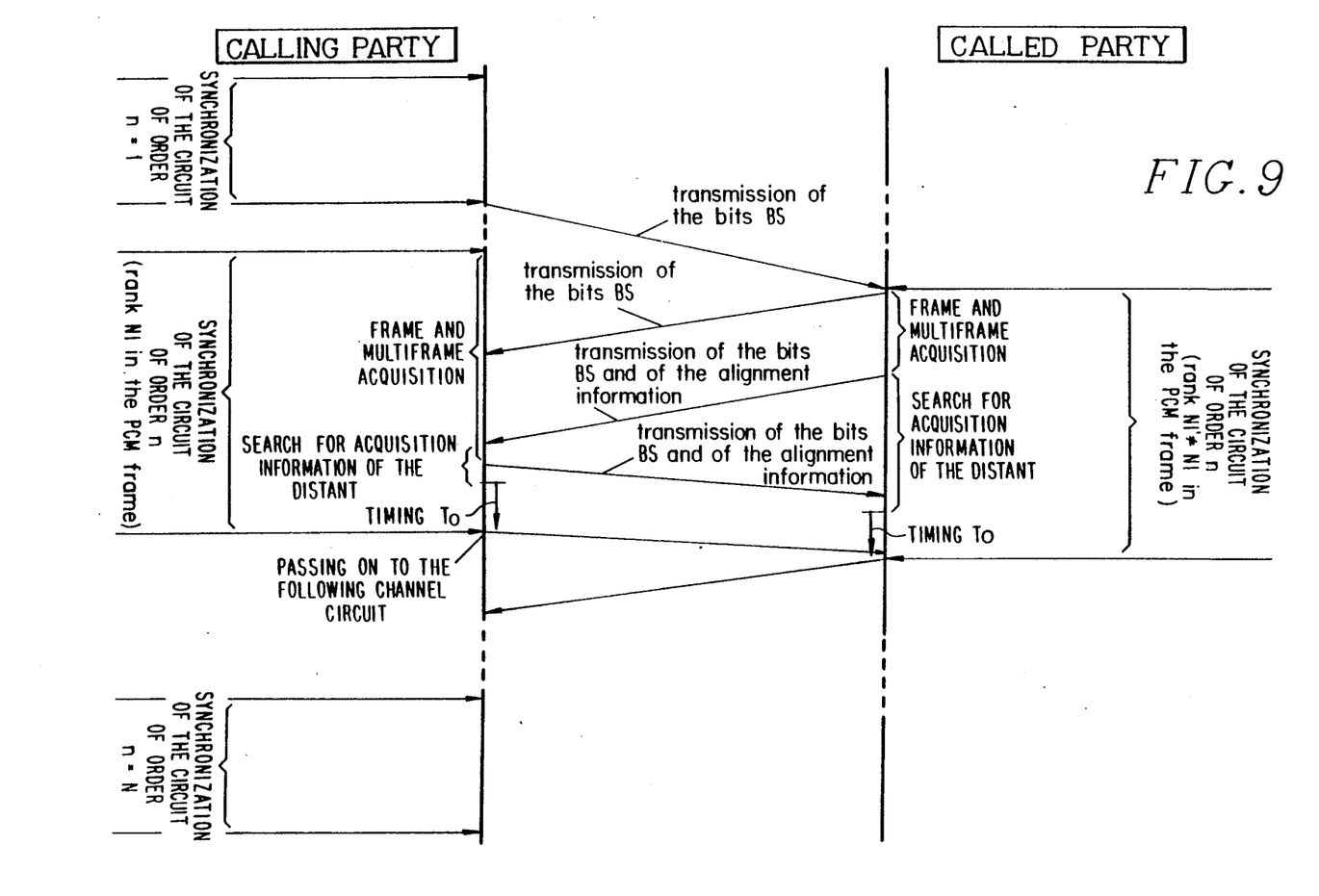
FIG. 9 is a diagram of a synchronization sub-phase.

In FIG. 9, the information exchanges occurring between a calling party end equipment and a called party end equipment during the synchronization sub-phase P15 are shown in the form of a diagram.

What I claim is:

1. A method of setting-in a high-rate telecommunications link between a transmission end and a reception end by association of a predetermined integer number n of independent channels in a synchronous time-division switching telecommunications network,
   synchronization frames being transmitted in each of said channels from said transmission end, and said frames being detected in said reception end to control the synchronization of channel receiving means and to compensate disparities in travelling times in the channels,
   said method being characterized by
   in the transmission end, transmitting said synchronization frames in said channels only during a setting-in and synchronizing phase of said high-rate link prior to a data transfer phase, and
   in said reception end, detecting sequentially said synchronization frames, the synchronization being carried out channel by channel, and
   during said data transfer phase, said high-rate link having a rate equal to n.D, whereby D is a rate strictly equal to a basic rate at which each channel disposes.

2. A method as claimed in claim 1, wherein during said setting-in and synchronizing phase, a first telecommunications link of rate D is derived between said transmission end and said reception end, and informations are exchanged between said ends so as to agree to the rate n.D of said high-rate link to be derived.

3. The method claimed in claim 2, wherein said exchanged informations further are subscriber numbers from said reception end supplied to said transmission end via said network thereby deriving n−1 additional links at said rate D.

4. The method as claimed in claim 1, wherein during said setting-in and synchronizing phase, said synchronization frames are exchanged sequentially, and
   between the synchronization of a channel and the synchronization of the next channel a set predetermined time is provided after reception by the corresponding end, transmitting from the other end a synchronization acknowledgement information during the set predetermined time after the transmission of said information by said corresponding end,
   a synchronization order between said channels having been previously derived so as to enable a dialog between said ends via a same bidirectional channel.

5. An end equipment receiving and transmitting digital data words at a rate n.D from and to a subscriber installation and being connected to a synchronous time-division switching network through a bidirectional time-division link at a rate N.D., where n is an integer than less the integer N, said link carrying N multiplex channels each having a basic rate D, said end equipment comprising
   means for transmitting data words from said subscriber installation into n transmission channels in said link,
   means for retransmitting data words from n reception channels of said link that correspond to said n transmission channels, to said subscriber installation, and control means controlling said transmitting and receiving means for setting-in a bidirectional communication through said n transmission channels and n reception channels in said link, said transmitting means comprising means for including synchronization bits taking place of bits in said data words to be transmitted into said transmission channels, only during a setting-in and synchronizing phase of said communication prior to a data transfer phase of said communication, thereby forming synchronized synchronization frames respectively in said n transmission channels, said retransmitting means comprising N channels circuits for respectively receiving said N reception channels, synchronization means activated during said setting-in and synchronizing phase and receiving sequentially said synchronization frames from said n reception channels for detecting the start of said synchronization frames as a function of said synchronization bits thereby successively synchronizing said channel circuits and compensating disparities in travelling times in said reception channels, a buffer memory containing N buffer queues respectively associated with said N reception channel circuits, means activated during said data transfer phase for writing said data words from said n reception channels into n associated ones of said buffer queues under the control of said synchronizing means, and means activated during said transfer phase for reading said data words in said n buffer queues thereby retransmitting multiplexed data words at said rate n.D to said subscriber installation.

6. The end equipment claimed in claim 5, wherein said synchronization means comprises means connected to each of said channel circuits for selecting sequentially said synchronization frames, reception channel by reception channel, and a synchronizing circuit receiving the selected synchronization frames for detecting the frame starts thereby producing at least one synchronization pulse per channel circuit involved in said communication during said setting-in and synchronizing phase, said synchronizing circuit also supplying said synchronization frames to said synchronization bit including means to be included sequentially into said n transmission channels of said communication, as well as a pulse indicating the end of synchronization acquisition for a channel circuit so as to control the synchronization for a subsequent channel circuit.

7. The end equipment as claimed in claim 5, wherein each of said channel circuits comprises means for detecting digital words in the associated reception channel, a register for temporarily storing each of the detected digital words, and counting means initiated by said synchronization means responsive to a start of synchronization frame in said associated reception channel during said setting-in and synchronizing phase, for deriving a write address intended for the associated buffer queue, said write address being incremented as said digital data words detected in said associated reception channel.

* * * * *